United States Patent
Li et al.

(10) Patent No.: US 12,152,947 B2
(45) Date of Patent: Nov. 26, 2024

(54) TEMPERATURE DETECTION DEVICE

(71) Applicant: Delta Electronics, Inc., Taoyuan (TW)

(72) Inventors: Cheng-Te Li, Taoyuan (TW);
Chih-Yuan Chuang, Taoyuan (TW);
Yen-Hsun Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 450 days.

(21) Appl. No.: 17/563,775

(22) Filed: Dec. 28, 2021

(65) Prior Publication Data

US 2022/0390291 A1 Dec. 8, 2022

(30) Foreign Application Priority Data

Jun. 4, 2021 (CN) .......................... 202110623075.5

(51) Int. Cl.
*G01K 7/22* (2006.01)
*G01K 1/02* (2021.01)
*G01K 7/24* (2006.01)

(52) U.S. Cl.
CPC ............... *G01K 7/22* (2013.01); *G01K 1/026* (2013.01); *G01K 7/24* (2013.01); *Y02T 10/70* (2013.01); *Y02T 10/7072* (2013.01)

(58) Field of Classification Search
CPC . G01K 7/22; G01K 1/026; G01K 7/24; Y02T 10/70; Y02T 10/7072
See application file for complete search history.

(56) References Cited

U.S. PATENT DOCUMENTS

| | | | | |
|---|---|---|---|---|
| 3,579,076 A | * | 5/1971 | Herbst | H02J 7/02 320/134 |
| 4,041,541 A | * | 8/1977 | Frossard | G01D 5/14 374/E1.004 |
| 4,196,382 A | * | 4/1980 | Bryzek | G01L 1/2281 73/726 |
| 4,676,664 A | * | 6/1987 | Anderson | G01K 13/10 374/E1.005 |

(Continued)

FOREIGN PATENT DOCUMENTS

| CN | 208043276 U | 11/2018 |
|---|---|---|
| TW | 567331 B | 12/2003 |

*Primary Examiner* — Nathaniel T Woodward
*Assistant Examiner* — Philip L Cotey
(74) *Attorney, Agent, or Firm* — KIRTON McCONKIE; Evan R. Witt

(57) ABSTRACT

A temperature detection device includes plural thermistors, a voltage source and plural temperature detection circuits. The first terminals of the thermistors are electrically connected with a common node. The voltage source is electrically connected with the common node directly. Each temperature detection circuit includes a voltage divider and a differential amplifier circuit. The voltage divider includes a first resistor and a second resistor. A first terminal of the first resistor is connected with the common node. A second terminal of the first resistor is connected with a first terminal of the second resistor and the second terminal of the corresponding thermistor. The second terminal of the second resistor is electrically connected with a ground terminal. The differential amplifier circuit includes a first input terminal connected with the first terminal of the first resistor, a second input terminal connected with the second terminal of the first resistor, and an output terminal.

10 Claims, 4 Drawing Sheets

(56) References Cited

U.S. PATENT DOCUMENTS

| | | | | |
|---|---|---|---|---|
| 5,189,362 | A * | 2/1993 | Doble | G01R 19/03 |
| | | | | 324/706 |
| 5,697,552 | A * | 12/1997 | McHugh | G05D 23/1904 |
| | | | | 236/78 B |
| 6,270,463 | B1 * | 8/2001 | Morris, Sr. | G01K 1/024 |
| | | | | 374/E1.004 |
| 7,755,326 | B1 * | 7/2010 | Thivierge | B60L 3/0046 |
| | | | | 320/122 |
| 9,194,588 | B2 * | 11/2015 | Bach | G01F 1/688 |
| 2009/0020517 | A1 * | 1/2009 | Ito | H03L 1/028 |
| | | | | 219/210 |
| 2010/0079116 | A1 * | 4/2010 | Thivierge | B60L 58/22 |
| | | | | 320/153 |
| 2013/0025364 | A1 * | 1/2013 | Bach | G01F 1/688 |
| | | | | 73/204.23 |
| 2015/0277461 | A1 * | 10/2015 | Anderson | H02J 1/14 |
| | | | | 307/32 |
| 2018/0266894 | A1 * | 9/2018 | Nishiyama | G01J 5/24 |
| 2019/0033142 | A1 * | 1/2019 | Nishiyama | G01K 7/25 |
| 2019/0187221 | A1 * | 6/2019 | Mukuno | G01R 31/367 |
| 2022/0065709 | A1 * | 3/2022 | Li | H03F 3/45475 |

* cited by examiner

TEMPERATURE DETECTION DEVICE

FIELD OF THE INVENTION

The present disclosure relates to a temperature detection device, and more particularly to a temperature detection device for reducing the influence of common mode noise and avoiding the mutual influence of dependent loops of a plurality of temperature detection circuits.

BACKGROUND OF THE INVENTION

Generally, various electronic devices are equipped with temperature detection devices. Due to the arrangement of the temperature detection device, the electronic device has the over-temperature protection function. Take the field of electric vehicles for example. A charging gun and the vehicle socket are used as the media between the charging equipment and the electric vehicle. When the user safety and the reliability are taken into consideration, the design specifications of the charging gun and the vehicle socket need to comply with the international safety regulations. For ensuring the working temperatures of the charging gun and the vehicle socket, the vehicle socket is usually equipped with thermistors. The cooperation of the thermistors and temperature detection circuits can monitor the temperature status in real time. In addition, the accurate temperature value report and the function of self-diagnosing errors are important safety indicators.

In order to detect the temperatures at a plurality of locations or increase the reliability of the temperature detection result, a plurality of thermistors electrically connected with each other are cooperated with a plurality of temperature detection circuits to monitor the temperature status in real time. FIG. 1 is a schematic circuit diagram illustrating the electric connection between a plurality of thermistors according to the conventional technology. The plurality of thermistors Rth are connected with each other in series, in parallel or in series and parallel, and the plurality of thermistors Rth are connected to a common node Ncom through a wire. For example, as shown in FIG. 1, the plurality of thermistors Rth are connected with each other in parallel. Consequently, each thermistor Rth has the function of detecting the temperature.

Regardless of the method of connecting the plurality of thermistors Rth with the common node Ncom, the uses of the plurality of thermistors Rth to detect the respective temperatures and the cooperation of the plurality of thermistors Rth and the corresponding temperature detection circuits generate some drawbacks. Firstly, the arrangement of the wire readily generates a common mode noise, which influences the accuracy of the temperature report value. Secondly, the common node Ncom electrically connected with the plurality of thermistors Rth is further electrically connected with a power source through a pull-up resistor. Due to the arrangement of the pull-up resistor and the power source, the temperature detection circuit can detect whether the corresponding thermistor Rth is in an open-circuit condition or whether the two terminals of the thermistor Rth are shorted to ground. However, due to the arrangement of the pull-up resistor, the voltage at the common node Ncom is changed with the impedance change of each loop. In other words, the plurality of temperature detection circuits form dependent loops and influence each other. Under this circumstance, the temperature reading accuracy of each thermistor Rth is deteriorated, and the function of self-diagnosing errors is unable to be effectively achieved.

Therefore, it is a need to provide an improved temperature detection device so as to address the issues encountered by the conventional technologies.

SUMMARY OF THE INVENTION

The present disclosure provides a temperature detection device for reducing the common mode noise and increasing accuracy of the temperature report value. Moreover, a plurality of temperature detection circuits of the temperature detection device do not form dependent loops and influence each other. In this way, the temperature reading accuracy is enhanced, and the function of self-diagnosing errors is achieved.

In accordance with an aspect of the present disclosure, a temperature detection device is provided. The temperature detection device includes a plurality of thermistors, a voltage source and a plurality of temperature detection circuits. Each of the plurality of thermistors includes a first terminal and a second terminal. The first terminals of the plurality of thermistors are electrically connected with a common node. The voltage source is electrically connected with the common node directly and provides a stable voltage. Each of the plurality of temperature detection circuits is electrically connected with the corresponding one of the plurality of thermistors. Each of the plurality of temperature detection circuits includes a voltage divider and a differential amplifier circuit. The voltage divider includes a first resistor and a second resistor. A first terminal of the first resistor is electrically connected with the common node. A second terminal of the first resistor is electrically connected with a first terminal of the second resistor and the second terminal of the corresponding one of the plurality of thermistors. The second terminal of the second resistor is electrically connected with a ground terminal. The differential amplifier circuit includes a first input terminal, a second input terminal and an output terminal. The first input terminal is electrically connected with the first terminal of the first resistor and the common node. The second input terminal is electrically connected with the second terminal of the first resistor and the second terminal of the corresponding one of the plurality of thermistors. The output terminal outputs a temperature detection signal. The temperature detection signal reflects a resistance change of the corresponding thermistor.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

In this context, the term "electric connection" indicates that the electric signal can be transmitted between two terminals. For example, two terminals are electrically connected with each other directly, two terminals are electrically connected with each other indirectly through a conductor, or two terminals are equipotential.

Figure 1:
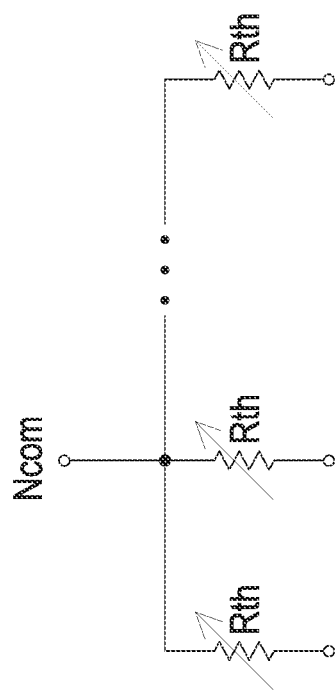
FIG. 1 is a schematic circuit diagram illustrating the electric connection between a plurality of thermistors according to the conventional technology.
Figure 2:
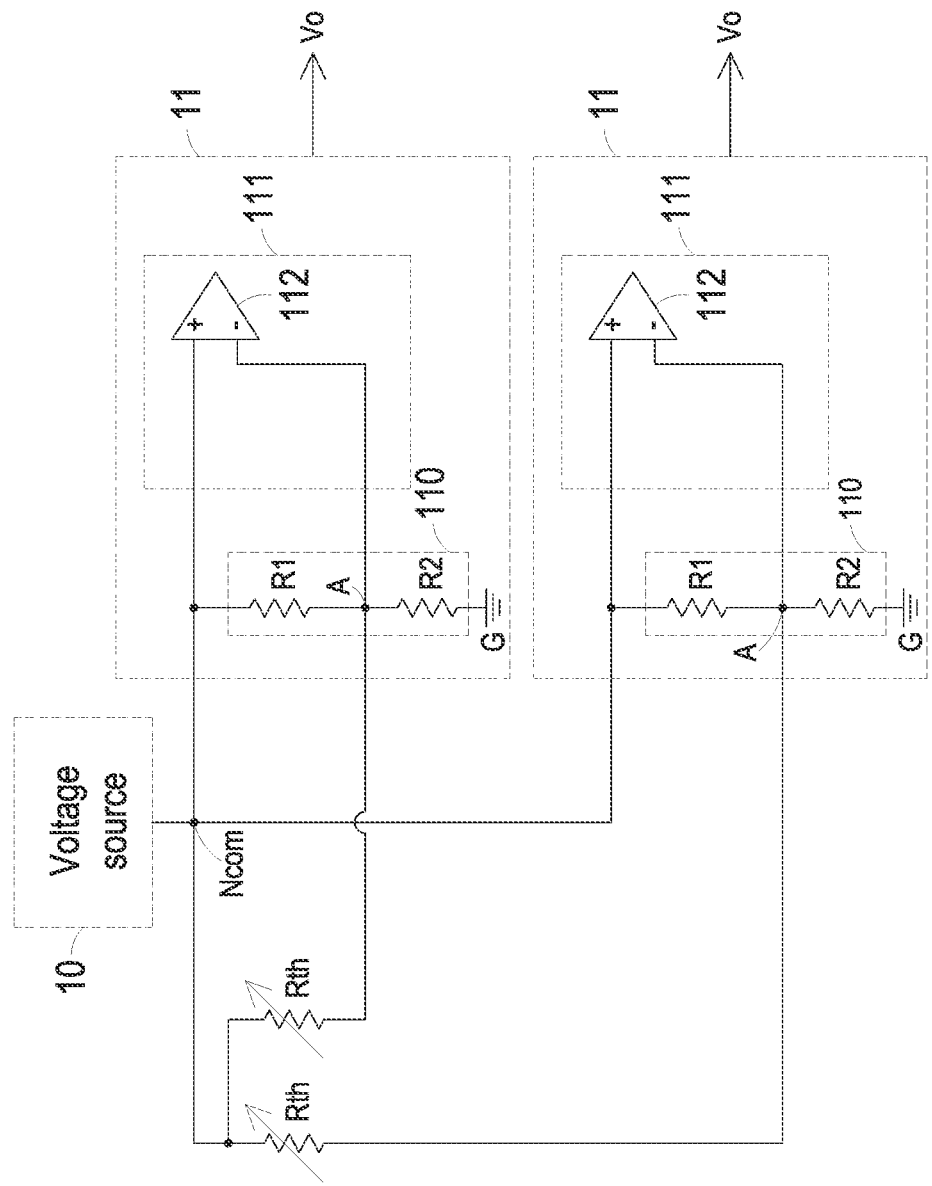
FIG. 2 is a schematic circuit diagram illustrating the circuitry structure of a temperature detection device according to an embodiment of the present disclosure.

FIG. 2 is a schematic circuit diagram illustrating the circuitry structure of a temperature detection device according to an embodiment of the present disclosure. The temperature detection device 1 can be applied to an electric vehicle. In the following embodiments, the temperature detection device 1 is applied to an electric vehicle to detect the temperatures at a plurality of internal locations of the electric vehicle, but not limited thereto. It is noted that the temperature detection device 1 can be applied to any other appropriate electronic device required to detect the temperatures at a plurality of internal locations of the electronic device.

The temperature detection device 1 includes a voltage source 10, a plurality of thermistors Rth and a plurality of temperature detection circuits 11. Each of the plurality of thermistors Rth is connected with a corresponding one of the plurality of temperature detection circuits 11. For clarification, only two thermistors Rth and two temperature detection circuits 11 are shown in FIG. 2. In fact, the temperature detection device 1 may include at least three thermistors Rth and at least three temperature detection circuits 11.

In an embodiment, the plurality of thermistors Rth are disposed at different locations in a vehicle socket. Consequently, the resistance values of the plurality of thermistors Rth are changed according to the temperature changes at the corresponding locations. Each of the plurality of thermistors Rth has a first terminal and a second terminal. The first terminals of the plurality of thermistors Rth are electrically connected with a common node Ncom.

The voltage source 10 is electrically connected with the common node Ncom directly. That is, there are no other electronic components between the voltage source 10 and the common node Ncom. The voltage source 10 provides a stable voltage. Each of the plurality of temperature detection circuits 11 is electrically connected with the first terminal and the second terminal of the corresponding one of the plurality of thermistors Rth. Each of the plurality of temperature detection circuits 11 is configured to detect the resistance change of the corresponding one of the plurality of thermistors Rth so as to provide a temperature detection signal Vo. The temperature detection signal Vo represents the temperature information at the location of the corresponding one of the plurality of thermistors Rth. In the embodiment, each temperature detection circuit 11 includes a voltage divider 110 and a differential amplifier circuit 111. The voltage divider 110 includes a first resistor R1 and a second resistor R2. The first terminal of the first resistor R1 is electrically connected with the common node Ncom. The second terminal of the first resistor R1, the first terminal of the second resistor R2 and the second terminal of the corresponding one of the plurality of thermistors Rth are connected to a detection node A. The second terminal of the second resistor R2 is electrically connected with a ground terminal G.

The differential amplifier circuit 111 has a first input terminal, a second input terminal and an output terminal. The first input terminal of the differential amplifier circuit 111 is electrically connected with the first terminal of the first resistor R1 and the common node Ncom. The second input terminal of the differential amplifier circuit 111 is electrically connected with the second terminal of the first resistor R1 and the second terminal of the corresponding one of the plurality of thermistors Rth. In other words, the second input terminal of the differential amplifier circuit 111 is electrically connected with the detection node A. The output terminal of the differential amplifier circuit 111 outputs the temperature detection signal Vo. According to the resistance change of the corresponding one of the plurality of thermistors Rth detected by the differential amplifier circuit 111, the temperature detection circuit 11 provides the temperature detection signal Vo that reflects the temperature information at the location of the corresponding one of the plurality of thermistors Rth.

Moreover, in the embodiment, due to the arrangement of the voltage divider 110, each temperature detection circuit 11 can detect whether the corresponding one of the plurality of thermistors Rth is in an open-circuit condition or whether the terminals of the corresponding one of the plurality of thermistors Rth are shorted to ground. In case that any thermistor Rth is connected normally, the voltage at the detection node A of the corresponding temperature detection circuit 11 is equivalent to the voltage division by a circuit of the corresponding thermistor Rth and the first resistor R1 connected in parallel and a second resistor 2. In case that any thermistor Rth is in the open-circuit condition, the voltage at the detection node A of the corresponding temperature detection circuit 11 is determined according to the voltage that is outputted from the voltage source 10 and subjected to the voltage division by the first resistor R1 and the second resistor R2. Consequently, the voltage cross the common node Ncom and the detection node A is maintained at a first voltage level. In case that the second terminal of any thermistor Rth is shorted to ground, the voltage at the detection node A of the corresponding temperature detection circuit 11 is equivalent to be shorted to ground. Consequently, the voltage cross the common node Ncom and the detection node A is maintained at a second voltage level. In case that the first terminal of any thermistor Rth is shorted to ground, the voltage cross the common node Ncom and the detection node A is zero. The first voltage level and the second voltage level are different. Consequently, the temperature detection circuit 11 detects whether the corresponding one of the plurality of thermistors Rth is in the open-circuit condition or whether two terminals of the corresponding one of the plurality of thermistors Rth are shorted to ground by determining whether the voltage cross the common node Ncom and the detection node A is the first voltage level, the second voltage level or zero. In other words, the temperature detection signal Vo outputted by the temperature detection circuit 11 is used to detect and determine whether the corresponding one of the plurality of thermistors Rth is in the open-circuit condition or whether any terminal of the corresponding one of the plurality of thermistors Rth is shorted to ground.

Since the temperature detection device 1 includes the plurality of thermistors Rth and the corresponding temperature detection circuits 11 and the locations of the plurality of thermistors Rth are different, the detection result of each temperature detection circuit 11 represents the temperature information at the location of the corresponding thermistor Rth. Consequently, the temperature detection device 1 can be used in various electronic devices required to detect the temperatures at different internal locations. In addition, each temperature detection circuit 11 of the temperature detection device 1 includes the differential amplifier circuit 111. Due to the characteristics of the differential amplifier circuit 111, the common mode noise is reduced, and the accuracy of the temperature report of the temperature detection device 1 is enhanced. Moreover, the temperature detection device 1 includes the voltage source 10. The voltage source 10 is electrically connected with the common node Ncom directly. Each temperature detection circuit 11 includes the voltage divider 110. Consequently, the temperature detection circuit 11 can detect whether the corresponding one of the plurality of thermistors Rth is in the open-circuit condition or whether two terminals of the corresponding one of the plurality of thermistors Rth are shorted to ground through the cooperation of the voltage source 10 and the voltage divider 110. Unlike the conventional temperature detection circuit, the temperature detection device 1 of the present disclosure does not need to be electrically connected to the common node Ncom with a pull-up resistor. The temperature detection device 1 can avoid the effect of voltage division. Consequently, the plurality of temperature detection circuits 11 do not form dependent loops and influence each other. In this way, the temperature reading accuracy is enhanced, and the function of self-diagnosing errors is achieved.

In some embodiments, as shown in FIG. 2, each differential amplifier circuit 111 includes a first amplifier 112. For example, the first amplifier 112 is an operation amplifier. The non-inverting input terminal of the first amplifier 112 is coupled to the first input terminal of the differential amplifier circuit 111. The inverting input terminal of the first amplifier 112 is coupled to the second input terminal of the differential amplifier circuit 111. The output terminal of the first amplifier 112 is served as the output terminal of the differential amplifier circuit 111.

Figure 3:
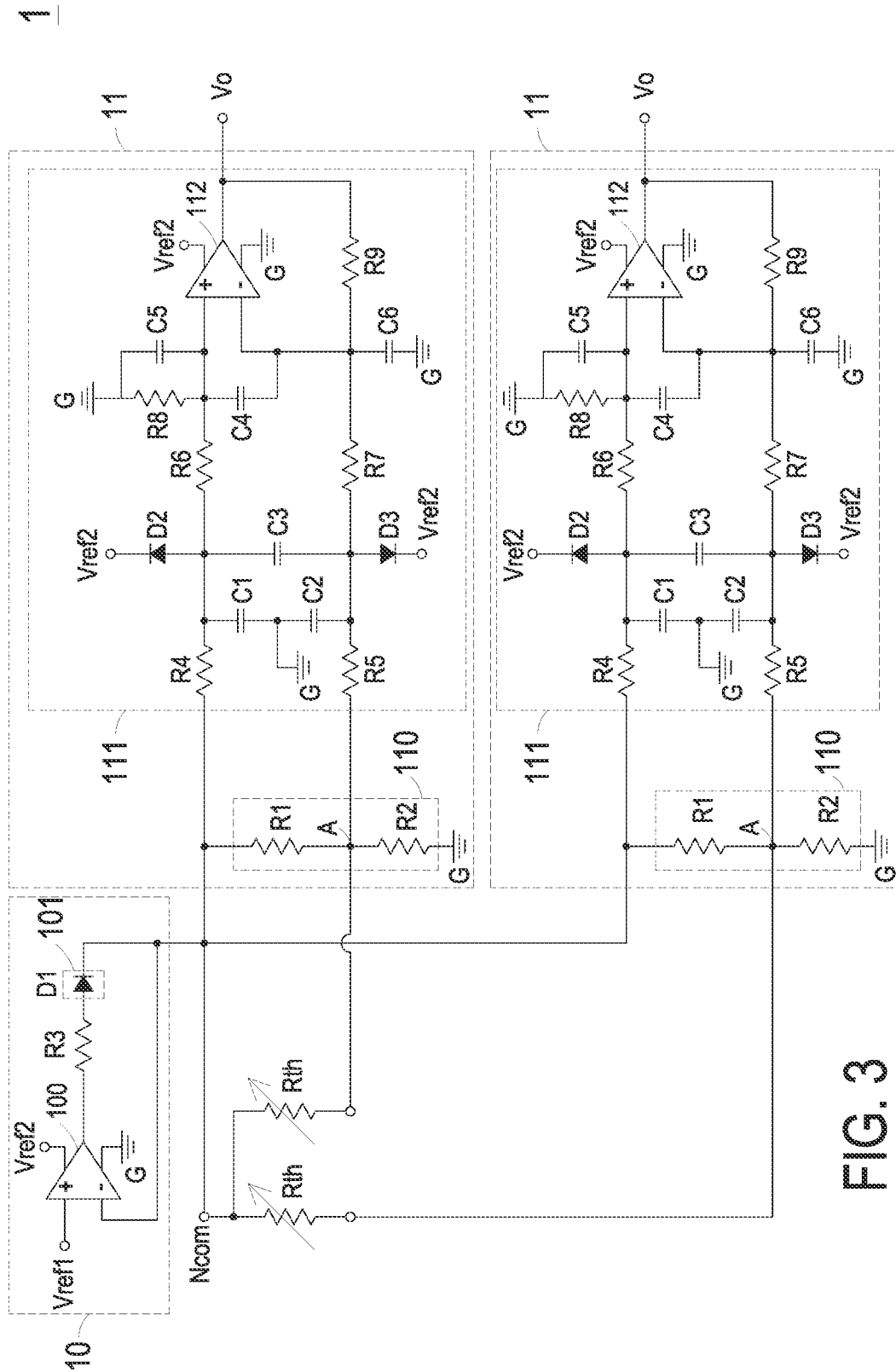
FIG. 3 is a schematic circuit diagram illustrating the detailed circuitry structure of the temperature detection device as shown in FIG. 2.

FIG. 3 is a schematic circuit diagram illustrating the detailed circuitry structure of the temperature detection device as shown in FIG. 2. As shown in FIG. 3, in the embodiment, the voltage source 10 includes a second amplifier 100, a third resistor R3 and a blocking circuit 101. The blocking circuit 101 is electrically connected with the common node Ncom to prevent the current from flowing back from the common node Ncom to the voltage source 10. In some embodiments, the second amplifier 100 is an operation amplifier. The blocking circuit 101 includes a first diode D1. A cathode of the first diode D1 is electrically connected with the common node Ncom. Certainly, in some other embodiments, the blocking circuit 101 also includes another electronic component that can limit the current flow path. For example, the electronic component is a bipolar transistor or any other appropriate switch element. The first terminal of the third resistor R3 is electrically connected with the output terminal of the second amplifier 100. The second terminal of the third resistor R3 is electrically connected with the anode of the first diode D1 of the blocking circuit 101. The third resistor R3 is configured to provide a current-limiting function. In other embodiment, the third resistor R3 and the first diode D1 are replaced with each other, and the current limiting and blocking functions are maintained as well. The non-inverting input terminal of the second amplifier 100 receives a first reference voltage Vref1. The inverting input terminal of the second amplifier 100 is electrically connected with the cathode of the first diode D1 of the blocking circuit 101. In other words, the second amplifier 100 has a negative feedback circuitry structure according to the connecting relationship of the second amplifier 100. Consequently, the diode D1 and the second amplifier 100 are collaboratively formed as a super diode. In this way, the voltage source 10 can output a stabilized voltage to the common node Ncom. The circuitry structure of the voltage source 10 is not restricted as long as the circuitry structure can provide the stabilized voltage. For example, in another embodiment, the blocking circuit 101 includes an NPN type bipolar transistor. The base of the NPN type bipolar transistor is connected with the second terminal of the third resistor R3. The emitter of the NPN type bipolar transistor is connected with the inverting input terminal of the second amplifier 100 to form a voltage buffer. Consequently, the common node Ncom is maintained to have a stable first reference voltage Vref1, and the common node Ncom has the function of blocking the current from flowing to the first reference voltage Vref1.

In addition, in some embodiments, each differential amplifier circuit 111 further includes a fourth resistor R4, a fifth resistor R5, a sixth resistor R6, a seventh resistor R7, an eighth resistor R8 and a ninth resistor R9. The first terminal of the fourth resistor R4 is electrically connected with the common node Ncom. The first terminal of the sixth resistor R6 is electrically connected with the second terminal of the fourth resistor R4. The second terminal of the sixth resistor R6 is electrically connected with the non-inverting input terminal of the first amplifier 112. The first terminal of the eighth resistor R8 is electrically connected with the second terminal of the sixth resistor R6 and the non-inverting input terminal of the first amplifier 112. The second terminal of the eighth resistor R8 is electrically connected with the ground terminal G. The first terminal of the fifth resistor R5 is electrically connected with the second terminal of the corresponding one of the plurality of thermistors Rth. The first terminal of the seventh resistor R7 is electrically connected with the second terminal of the fifth resistor R5. The first terminal of the ninth resistor R9 is electrically connected with the second terminal of the seventh resistor R7. The second terminal of the ninth resistor R9 is electrically connected with the output terminal of the first amplifier 112. Due to the arrangements of the third resistor R3, the fourth resistor R4, the fifth resistor R5, the sixth resistor R6, the seventh resistor R7, the eighth resistor R8 and the ninth resistor R9, the differential amplifier circuit 111 achieves the function of the differential mode amplification and reduces the common mode noise more effectively.

In some other embodiments, each differential amplifier circuit 111 further includes a first capacitor C1, a second capacitor C2, a third capacitor C3 and a fourth capacitor C4. The first terminal of the first capacitor C1 is electrically connected with the second terminal of the fourth resistor R4 and the first terminal of the sixth resistor R6. The second terminal of the first capacitor C1 is electrically connected with the ground terminal G. The first terminal of the second capacitor C2 is electrically connected with the second terminal of the first capacitor C1 and the ground terminal G. The second terminal of the second capacitor C2 is electrically connected with the second terminal of the fifth resistor R5 and the first terminal of the seventh resistor R7. The first terminal of the third capacitor C3 is electrically connected with the second terminal of the fourth resistor R4 and the first terminal of the sixth resistor R6. The second terminal of the third capacitor C3 is electrically connected with the second terminal of the fifth resistor R5 and the first terminal of the seventh resistor R7. The first terminal of the fourth capacitor C4 is electrically connected with the second terminal of the sixth resistor R6 and the non-inverting input terminal of the first amplifier 112. The second terminal of the fourth capacitor C4 is electrically connected with the second terminal of the seventh resistor R7, the first terminal of the ninth resistor R9 and the inverting input terminal of the first amplifier 112. The first capacitor C1, the second capacitor C2, the third capacitor C3 and the fourth capacitor C4 are configured to provide the filtering function.

In addition, each differential amplifier circuit 111 further includes a second diode D2 and a third diode D3. The cathode of the second diode D2 receives a second reference voltage Vref2. The anode of the second diode D2 is electrically connected with the second terminal of the fourth resistor R4 and the first terminal of the sixth resistor R6. The cathode of the third diode D3 receives the second reference voltage Vref2. The anode of the third diode D3 is electrically connected with the second terminal of the fifth resistor R5 and the first terminal of the seventh resistor R7. The second diode D2 and the third diode D3 are configured to provide a voltage clamping function.

Each differential amplifier circuit 111 further includes a fifth capacitor C5 and a sixth capacitor C6. The first terminal of the fifth capacitor C5 is electrically connected with the second terminal of the sixth resistor R6 and the non-inverting input terminal of the first amplifier 112. The second terminal of the fifth capacitor C5 is connected with the ground terminal G. The first terminal of the sixth capacitor C6 is electrically connected with the second terminal of the seventh resistor R7, the first terminal of the ninth resistor R9 and the inverting input terminal of the first amplifier 112. The second terminal of the sixth capacitor C6 is electrically connected with the ground terminal G. Due to the arrangements of the fifth capacitor C5 and the sixth capacitor C6, the differential amplifier circuit 111 is formed as a low-pass filter differential amplifier circuit.

Figure 4:
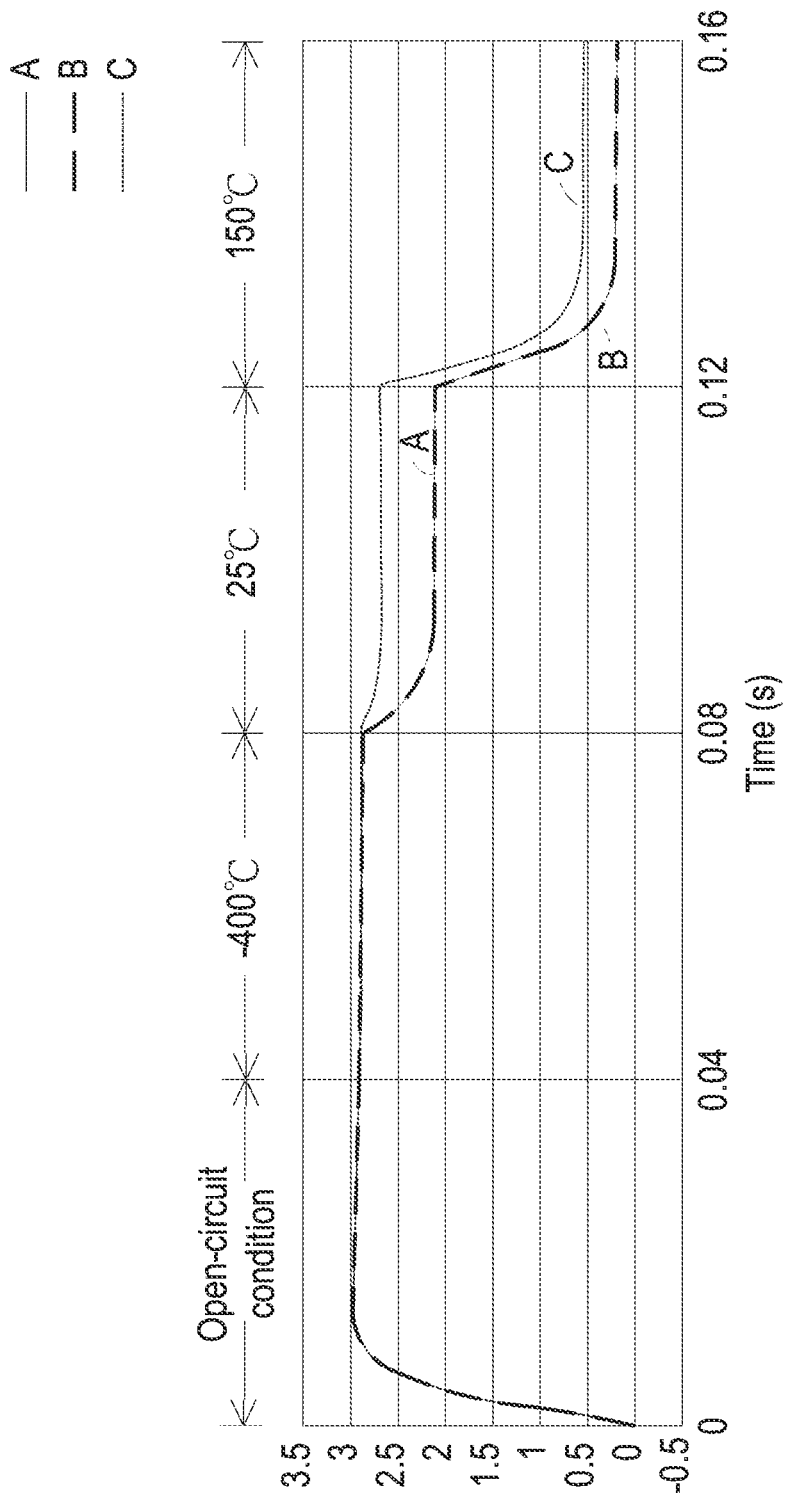
FIG. 4 is a schematic diagram illustrating the simulation results of the temperature detection device at different temperatures according to an embodiment of the present disclosure.

Please refer to FIG. 4 and also refer to FIG. 2 and FIG. 3. FIG. 4 is a schematic diagram illustrating the simulation results of the temperature detection device at different temperatures according to an embodiment of the present disclosure. In FIG. 4, four simulation conditions are shown. The four simulation conditions include an open-circuit condition of the plurality of thermistors Rth, the condition of the thermistors Rth at the temperature of −40° C., the condition of the thermistors Rth at the temperature of 25° C. and the condition of the thermistors Rth at the temperature of 150° C. The curve A represents the changes of the temperature detection signal from the temperature detection device in the four simulation conditions when a single temperature detection circuit is used to detect a single thermistor. The curve B and curve C represent the changes of the temperature detection signals from the two temperature detection circuits 11 of the temperature detection device 1 as shown in FIG. 2 in the four simulation conditions. In addition, thermistor Rth detected by the temperature detection circuit corresponding to the curve A and the thermistor Rth detected by the temperature detection circuit 11 corresponding to the curve B are identical thermistor and at the same location. It is found that the changes of the temperature detection signal corresponding to the curve B in the four simulation conditions and the changes of the temperature detection signal corresponding to the curve A in the four simulation conditions are substantially in coincide with each other. That is, the simulation results of one temperature detection circuit 11 (i.e., the curve B) are not affected by the simulation results of the other temperature detection circuit 11 (i.e., the curve C). As mentioned above, the voltage source 10 of the temperature detection device 1 is directly connected with the common node Ncom without the need of using a pull-up resistor. Consequently, the plurality of temperature detection circuits 11 do not form dependent loops and influence each other.

From the above descriptions, the present disclosure provides a temperature detection device. The temperature detection device includes a plurality of thermistors and a plurality of temperature detection circuits. Consequently, the temperature detection device can be used in various electronic devices required to detect the temperatures at different internal locations. Each temperature detection circuit of the temperature detection device includes the differential amplifier circuit. Due to the characteristics of the differential amplifier circuit, the common mode noise is reduced, and the accuracy of the temperature report of the temperature detection device is enhanced. Moreover, the temperature detection device includes the voltage source electrically connected with the common node directly, and each temperature detection circuit includes the voltage divider. Consequently, the temperature detection circuit detects whether the corresponding one of the plurality of thermistors is in the open-circuit condition or whether two terminals of the corresponding one of the plurality of thermistors are shorted to ground through the cooperation between the voltage source and the temperature detection circuits. The temperature detection device is electrically connected to the common node without the need of using a pull-up resistor. Consequently, the plurality of temperature detection circuits do not form dependent loops and influence each other. In this way, the temperature reading accuracy is enhanced, and the function of self-diagnosing errors is achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A temperature detection device, comprising:
a plurality of thermistors, each of which comprises a first terminal and a second terminal, wherein the first terminals of the plurality of thermistors are directly and electrically connected with a common node;
a voltage source electrically connected with the common node directly and providing a stable voltage; and
a plurality of temperature detection circuits, each of which is directly and electrically connected with the corresponding one of the plurality of thermistors, wherein each of the plurality of temperature detection circuits comprises:
a voltage divider comprising a first resistor and a second resistor, wherein a first terminal of the first resistor is directly and electrically connected with the common node, a second terminal of the first resistor is directly and electrically connected with a first terminal of the second resistor and the second terminal of the corresponding one of the plurality of thermistors, and a second terminal of the second resistor is directly and electrically connected with a ground terminal; and
a differential amplifier circuit comprising a first input terminal, a second input terminal and an output terminal, wherein the first input terminal is directly and electrically connected with the first terminal of the first resistor and the common node, the second input terminal is directly and electrically connected with the second terminal of the first resistor and the second terminal of the corresponding one of the plurality of thermistors, and the output terminal outputs a temperature detection signal, wherein the temperature detection signal reflects a resistance change of the corresponding one of the plurality of thermistors.

2. The temperature detection device according to claim 1, wherein the differential amplifier circuit comprises a first amplifier, wherein a non-inverting input terminal of the first amplifier is coupled to the first input terminal, an inverting input terminal of the first amplifier is coupled to the second input terminal, and an output terminal of the first amplifier is served as the output terminal of the differential amplifier circuit.

3. The temperature detection device according to claim 2, wherein the differential amplifier circuit comprises a fourth resistor, a fifth resistor, a sixth resistor, a seventh resistor, an eighth resistor and a ninth resistor, wherein a first terminal of the fourth resistor is electrically connected with the common node, a first terminal of the sixth resistor is electrically connected with a second terminal of the fourth resistor, a second terminal of the sixth resistor is electrically connected with the non-inverting input terminal of the first amplifier, a first terminal of the eighth resistor is electrically connected with the second terminal of the sixth resistor and the non-inverting input terminal of the first amplifier, a second terminal of the eighth resistor is electrically connected with the ground terminal, a first terminal of the fifth resistor is electrically connected with the second terminal of the corresponding one of the plurality of thermistors, a first terminal of the seventh resistor is electrically connected with a second terminal of the fifth resistor, a first terminal of the ninth resistor is electrically connected with a second terminal of the seventh resistor, and a second terminal of the ninth resistor is electrically connected with the output terminal of the first amplifier.

4. The temperature detection device according to claim 3, wherein the differential amplifier circuit comprises a first capacitor, a second capacitor, a third capacitor and a fourth capacitor, wherein a first terminal of the first capacitor is electrically connected with the second terminal of the fourth resistor and the first terminal of the sixth resistor, a second terminal of the first capacitor is electrically connected with the ground terminal, a first terminal of the second capacitor is electrically connected with the second terminal of the first capacitor and the ground terminal, a second terminal of the second capacitor is electrically connected with the second terminal of the fifth resistor and the first terminal of the seventh resistor, a first terminal of the third capacitor is electrically connected with the second terminal of the fourth resistor and the first terminal of the sixth resistor, a second terminal of the third capacitor is electrically connected with the second terminal of the fifth resistor and the first terminal of the seventh resistor, a first terminal of the fourth capacitor is electrically connected with the second terminal of the sixth resistor and the non-inverting input terminal of the first amplifier, and a second terminal of the fourth capacitor is electrically connected with the second terminal of the seventh resistor, the first terminal of the ninth resistor and the inverting input terminal of the first amplifier.

5. The temperature detection device according to claim 3, wherein the differential amplifier circuit comprises a second diode and a third diode, wherein a cathode of the second diode receives a second reference voltage, an anode of the second diode is electrically connected with the second terminal of the fourth resistor and the first terminal of the sixth resistor, a cathode of the third diode receives the second reference voltage, and an anode of the third diode is electrically connected with the second terminal of the fifth resistor and the first terminal of the seventh resistor.

6. The temperature detection device according to claim 3, wherein the differential amplifier circuit comprises a fifth capacitor and a sixth capacitor, wherein a first terminal of the fifth capacitor is electrically connected with the second terminal of the sixth resistor and the non-inverting input terminal of the first amplifier, a second terminal of the fifth capacitor is connected with the ground terminal, a first terminal of the sixth capacitor is electrically connected with the second terminal of the seventh resistor, the first terminal of the ninth resistor and the inverting input terminal of the first amplifier, and a second terminal of the sixth capacitor is electrically connected with the ground terminal.

7. The temperature detection device according to claim 1, wherein the voltage source comprises:
a blocking circuit electrically connected with the common node and configured to prevent a current from flowing back from the common node to the voltage source;
a second amplifier, wherein a non-inverting input terminal of the second amplifier receives a first reference voltage, and an inverting input terminal of the second amplifier is electrically connected with the blocking circuit; and
a third resistor, wherein a first terminal of the third resistor is electrically connected with an output terminal of the second amplifier, and a second terminal of the third resistor is electrically connected with the blocking circuit.

8. The temperature detection device according to claim 7, wherein the blocking circuit comprises a first diode, wherein a cathode of the first diode is electrically connected with the common node, and an anode of the first diode is electrically connected with the second terminal of the third resistor.

9. The temperature detection device according to claim 7, wherein the blocking circuit comprises an NPN type bipolar transistor, wherein a base of the NPN type bipolar transistor is connected with the second terminal of the third resistor, and an emitter of the NPN type bipolar transistor is connected with the inverting input terminal of the second amplifier.

10. The temperature detection device according to claim 1, wherein in each of the plurality of temperature detection circuits, the second terminal of the first resistor and the first terminal of the second resistor are connected to a detection node, wherein when one of the plurality of thermistors is in an open-circuit condition, a voltage cross the common node and the detection node of the corresponding one of the plurality of temperature detection circuits is maintained at a first voltage level, wherein when the second terminal of one of the plurality of thermistors is shorted to ground, the voltage cross the common node and the detection node of the corresponding one of the plurality of temperature detection circuits is maintained at a second voltage level, wherein the first voltage level and the second voltage level are different.

* * * * *